A. GILMORE.
Bee Hive.
No. 6,494. Patented June 5, 1849.
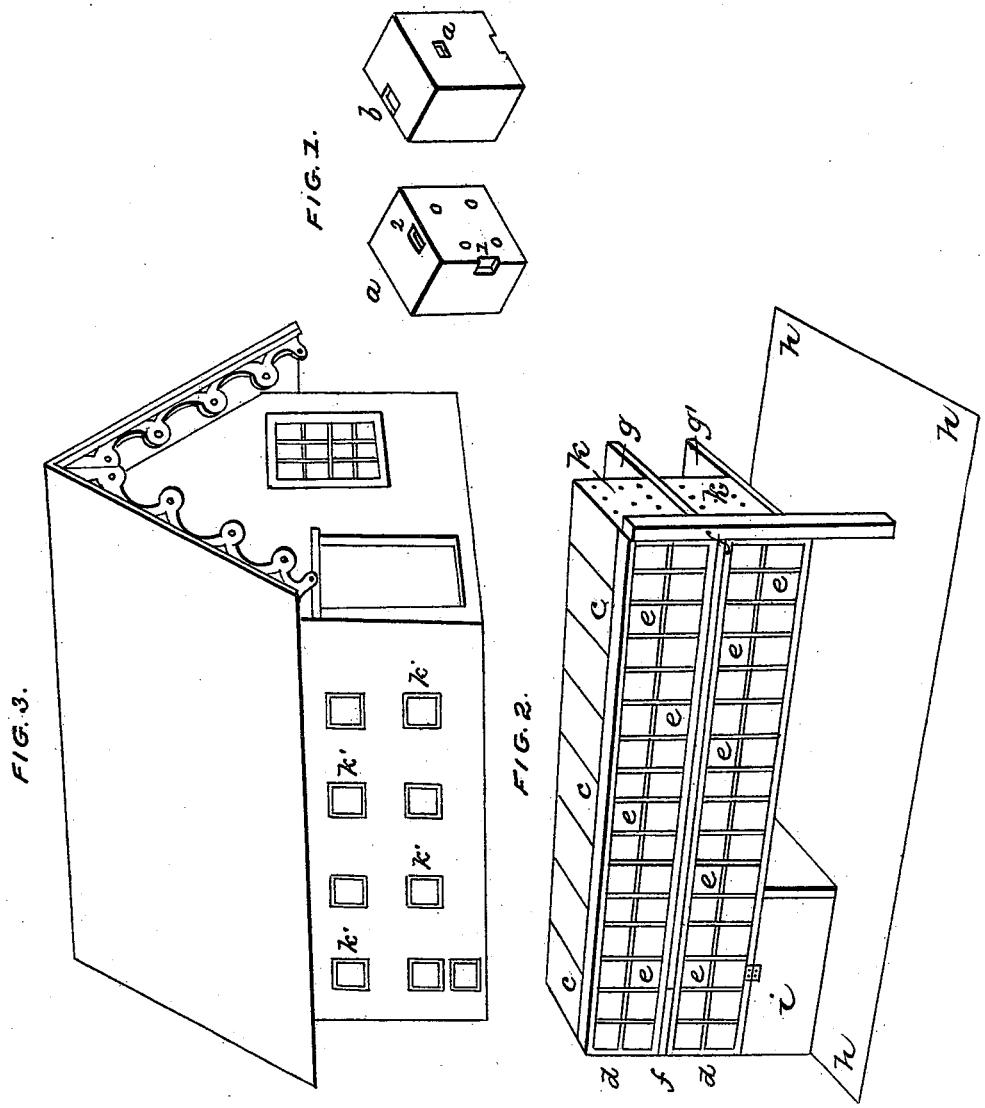
WITNESSES:
INVENTOR.

UNITED STATES PATENT OFFICE.

ARZA GILMORE, OF WAYNE, MAINE.

BEEHIVE.

Specification of Letters Patent No. 6,494, dated June 5, 1849.

*To all whom it may concern:*

Be it known that I, the undersigned ARZA GILMORE, of Wayne, in the county of Kennebec and State of Maine, have invented a new Mode of Arranging Beehives in an Apiary and of Managing Bees in the Same, called "Gilmore's Apiary or Bee-House, of which the following is a full and exact description, reference being had to the accompanying drawings.

Figure 1, represents the beehives. *a* shows the back side of one perforated with four large holes for the bees to pass through into boxes set against them as hereafter described. 1 shows a square opening through which the bees pass into another hive having a similar opening to match when placed beside it. 2 shows a similar opening for the bees to pass up into a hive set above it. When one hive is set above another a shelf is placed between them and a corresponding hole cut in the shelf. *b*. represents the front side of the same hive showing the holes or openings into or through which the bees pass and repass.

Fig. 2 represents the hives as arranged in the house with the boxes attached. *h* represents the floor of the house, say six feet in width and twelve feet long. *c, c, c, c, c, c,* the hives placed side by side with the same number below them. *d, d, d,* the boxes placed in racks or cases in close contact with the hives. Four boxes are placed to a hive—they have a hole in the back corresponding with the holes in the hives against which they are placed and a pane of glass in front. When they are in place the whole of them are kept dark by shutters, not represented in the drawing, and which are kept closed except when examining or charging boxes. *e, e, e, e, e,* are partitions made to slide in and shut off the communication between the hives sideways, and *f, f, f, f,* are slides to shut off the communication between the upper and lower hives. In this way any number of hives may be all thrown into one or kept closed as the operator may desire. These hives are set upon shelves *g, g,* which extend forward of the hives to the front side of the house, thus making two galleries, an upper and a lower one for the bees to enter and pass through to the hives. The front part of the upper shelf 3 is movable and may be taken away if the proprietor wishes, and thus throw both galleries into one. Below the hives at *i* is a dark closet, large enough to receive a hive. It has two small openings, one to enter the main gallery between the shelves *g* and the other in front of the hive. This closet is used for this purpose, viz, when boxes of honey are taken out there will be some bees in them; put them into the closet and shut the door and the bees will make their escape through the orifice in the front of the hive and go back to the hives. I also use it for the purpose of causing the bees in a wild or strange hive to leave it and mingle peaceably with the bees in the house. To do this, place the wild or foreign hive in the closet, close the door in front, and open that which enters the gallery and the bees will soon escape and mingle and work peaceably with those in the house. Thus your bees may be augmented in numbers by bringing wild swarms from the woods or by purchase of hives abroad. *k, k, k,* represents smaller holes made in the ends of the two end hives against which the mouths of tumblers are placed by laying them on their sides in a rack and shutting the light by shutters.

Fig. 3 is a perspective view of the house or apiary in which the hives are placed showing the front and one end. The end has a door for the entrance of persons and a window to admit light and air. On the backside are two or more similar windows. The openings *a, a, a,* in front, are made for the bees to pass and repass through while working. Each opening is furnished with a shutter to close it tightly whenever desired. By these openings the bees may be easily made to work in any part of the hives or house, and their deposits of honey directed according to the pleasure of the proprietor, in the following manner. If you wish more honey deposited in the middle hives, close the openings at each end. If at each end, close the openings in the middle. If at either end close the openings of the other end and the middle. If in the top hives, close the openings below. If in the lower hives close the openings above.

What I claim as my invention and desire to secure by Letters Patent is—

1. The employment of the slide door 3 in combination with the open galleries above and below—the same for the purpose of separating or combining at the will of the apiary the several tiers of chambers as described and represented.

2. I also claim the use of the dark chamber $i$, with a passage out of the same through the main body of the working hives for the purpose of domesticating wild or foreign bees by compelling them in leaving the dark chamber to pass through or into the working chambers of the bee house.

In testimony whereof I the said Arza Gilmore hereto subscribe my name in the presence of the witnesses whose names are hereto subscribed on the 19th day of September, A. D. 1848.

ARZA GILMORE.

Witnesses:
E. HOLMES,
ALEX. BELIHER.